United States Patent

Kato et al.

[11] Patent Number: 6,051,181
[45] Date of Patent: Apr. 18, 2000

[54] PROCESS FOR PRODUCTION OF CERAMIC PRODUCT

[75] Inventors: Shigeki Kato; Shinji Ohtsubo, both of Nagoya, Japan

[73] Assignee: NGK Insulators, Ltd., Nagoya, Japan

[21] Appl. No.: 09/233,105

[22] Filed: Jan. 19, 1999

Related U.S. Application Data

[63] Continuation of application No. 08/618,386, Mar. 19, 1996, abandoned.

[30] Foreign Application Priority Data

Mar. 28, 1995 [JP] Japan .................................. 7-69261

[51] Int. Cl.$^7$ .................................................. C04B 33/32
[52] U.S. Cl. .......................................... 264/645; 264/656
[58] Field of Search .............................. 264/645, 656, 264/657, 328.2, 328.18

[56] References Cited

U.S. PATENT DOCUMENTS

| | | | |
|---|---|---|---|
| 4,560,526 | 12/1985 | Okumura | 264/328.2 |
| 4,713,206 | 12/1987 | Matsuhisa et al. | 264/328.2 |
| 5,087,594 | 2/1992 | Kato et al. | 501/97 |
| 5,135,712 | 8/1992 | Kijima et al. | 419/36 |
| 5,283,213 | 2/1994 | Ohst et al. | 501/87 |
| 5,340,516 | 8/1994 | Yavuz et al. | 264/63 |
| 5,429,781 | 7/1995 | Montgomery | 264/63 |

FOREIGN PATENT DOCUMENTS

| | | |
|---|---|---|
| 35 07 804 A1 | 9/1985 | Germany. |
| 39 42 666 A1 | 6/1990 | Germany. |
| 41 29 952 A1 | 3/1993 | Germany. |

OTHER PUBLICATIONS

U. Haupt, "Das Spritzgiessen von Pulverwerkstoffen", Keramische Zeitschriften 43 Jg., Nr. 11, 860–862 (1991).

Reed, James R., Principles of Ceramics Processing, Second Edition, A Wiley–Interscience Publication, pp. 485–486, 1995.

*Primary Examiner*—Christopher A. Fiorilla
*Attorney, Agent, or Firm*—Kubovcik & Kubovcik

[57] ABSTRACT

A process for producing a ceramic product includes mixing and kneading a ceramic powder and a binder to obtain a mixture to be molded, injecting the mixture into the cavity of a mold to obtain a molded material, releasing the molded material and subjecting the released molded material to degreasing and firing. The weight of the molded material is controlled. With this process, it is possible to determine favorable molding conditions prior to the degreasing step, whereby a ceramic product free from molding defect and degreasing defect and having excellent dimensional accuracy can be obtained at high productivity.

2 Claims, 2 Drawing Sheets

PROCESS FOR PRODUCTION OF CERAMIC PRODUCT

This application is a continuation of application Ser. No. 08/618,386, filed Mar. 19, 1996 now abandoned.

BACKGROUND OF THE INVENTION (1) Field of the Invention

The present invention relates to a process for producing a ceramic product having a complicated shape. More particularly, the present invention relates to a process for producing a ceramic product of complicated shape by controlling the weight of a molding mixture to be injected into the cavity of a mold.

(2) Description of the Prior Art

Injection molding has been known as a process for production of a ceramic product, particularly a ceramic product having a complicated shape. In recent years, with the improvement in the techniques of related fields, it has been investigated to apply the injection molding even for production of a ceramic product having a complicated shape and yet a large dimension, for example, a gas turbine part such as dynamic blade, static blade or the like.

In the conventional injection molding, however, it has been difficult to control the operation of a molding machine, the fluidity of mixture to be molded, etc. and, as a result, it has been difficult to grasp the optimum molding conditions which can give satisfactory degreasing and sintering. Besides, the molded material has shown cracking and deformation during degreasing in some cases. As the causes therefor, there are considered, for example, the large density distribution of molded material due to inappropriate molding conditions, the inappropriate degreasing operation, and the high binder content in molded material. No adequate solution thereto has been found out.

For the above-mentioned cracking, etc. appearing during degreasing, taking a longer time during degreasing might be one solution. In this case, however, since it is impossible to reflect the molding conditions obtained with one molded material, in preparation of other molded material to quickly determine the molding conditions for the other molded material, a long time has been necessary for determining favorable molding conditions.

OBJECT AND SUMMARY OF THE INVENTION

The present invention has been made in view of the above-mentioned problems of the prior art. The object of the present invention is to provide an injection molding process in which process favorable molding conditions can be determined prior to the degreasing step and which can produce a ceramic product free from molding defect or degreasing defect and having excellent dimensional accuracy, at high productivity.

The present inventor made a study on the conditions of injection molding and the weight of injection molded material. As a result, the present inventor found out the conditions of injection molding allowing for stable degreasing and sintering, by appropriately controlling the weight of a molding mixture to be filled into the cavity of a mold, based on the theoretical density of the mixture and the volume of the cavity. The finding has led to the completion of the present invention.

The present invention provides a process for producing a ceramic product comprising: mixing and kneading a ceramic powder and a binder to obtain a mixture to be molded, injecting the mixture into the cavity of a mold to obtain a molded material, releasing the molded material and subjecting the released molded material to degreasing and firing, wherein the weight of the molded material is controlled.

In the present invention, the weight I of the molded material preferably satisfies the following formula:

$$0.92 \times Di \times Vc \leq I \leq 0.98 \times Di \times Vc$$

where Di is the theoretical density (g/cc) of the mixture to be molded and Vc is the volume (cc) of the cavity.

As mentioned above, in the present invention, the weight of the molding mixture to be filled into the cavity is appropriately controlled based on the theoretical density of the mixture to be molded and the volume of the cavity. By thus controlling the weight of the molded material, the molded material has a more uniform density and generates neither molding defect nor degreasing defect.

Since the above control can be made before a degreasing step is conducted, the present process, as compared with the conventional injection molding process for ceramic product wherein the determination of the molding conditions has been possible only after the degreasing step, can provide a molded material at high productivity.

DETAILED DESCRIPTION OF THE INVENTION

The present process for production of ceramic product is hereinafter described in detail.

There is no particular restriction as to the kind of the ceramic powder used as a molding material. The ceramic powder can be exemplified by silicon nitride, carbon nitride, sialon, zirconia and alumina.

There is no particular restriction, either, as to the kind of the binder. The binder can be appropriately selected depending upon the ceramic product to be produced and the kind of the ceramic powder used. Specifically, the binder can be a wax, a resin, a surfactant or the like.

There is no particular restriction, either, as to the type of the injection molding machine used. The injection molding machine may be any of a plunger type and an in-line screw type.

There is no particular restriction, either, as to the method of the degreasing used. There can be used normal-pressure degreasing, applied-pressure degreasing, super-critical degreasing, etc. all conducted ordinarily. The atmosphere used during degreasing may be any of air and an inert gas. The conditions for firing can be appropriately determined depending upon the kind of the ceramic powder used.

Next, description is made on the weight of the molded material obtained as above.

The weight I of the molded material satisfies the following formula:

$$0.92 \times Di \times Vc \leq I \leq 0.98 \times Di \times Vc$$

where Di is the theoretical density (g/cc) of the mixture to be molded and Vc is the volume (cc) of the cavity into which the mixture is injected.

When the theoretical weight (Iw) of the molded material is DixVc, the weight I of the molded material becomes 92–98% of the theoretical weight (Iw) of the molded material. The weight I of the molded material is more preferably 93–97% of the theoretical weight (Iw) of the molded material.

When the weight I of the molded material is less than 92% of the theoretical weight (Iw) of the molded material, the degree of filling is insufficient (low) and the resulting molded material has a lower density at the interior than at the surface and, as a result, the molded material has a large density distribution. When the filling degree decreases further, the molded material has defects such as no filling, shrinkage and the like. Further, cracking occurs in the degreasing step and the dimensional accuracy of the resulting product is insufficient.

When the weight I of the molded material is more than 98%, the filling degree is too high and the resulting molded material has a higher density at the interior than at the surface and, as a result, the molded material has a large density distribution and comes to have a residual stress at the interior. Further, melting of the binder in the degreasing step results in the release of said stress and the formation of cracks, and the dimensional accuracy of the resulting product is reduced.

Figure 2:
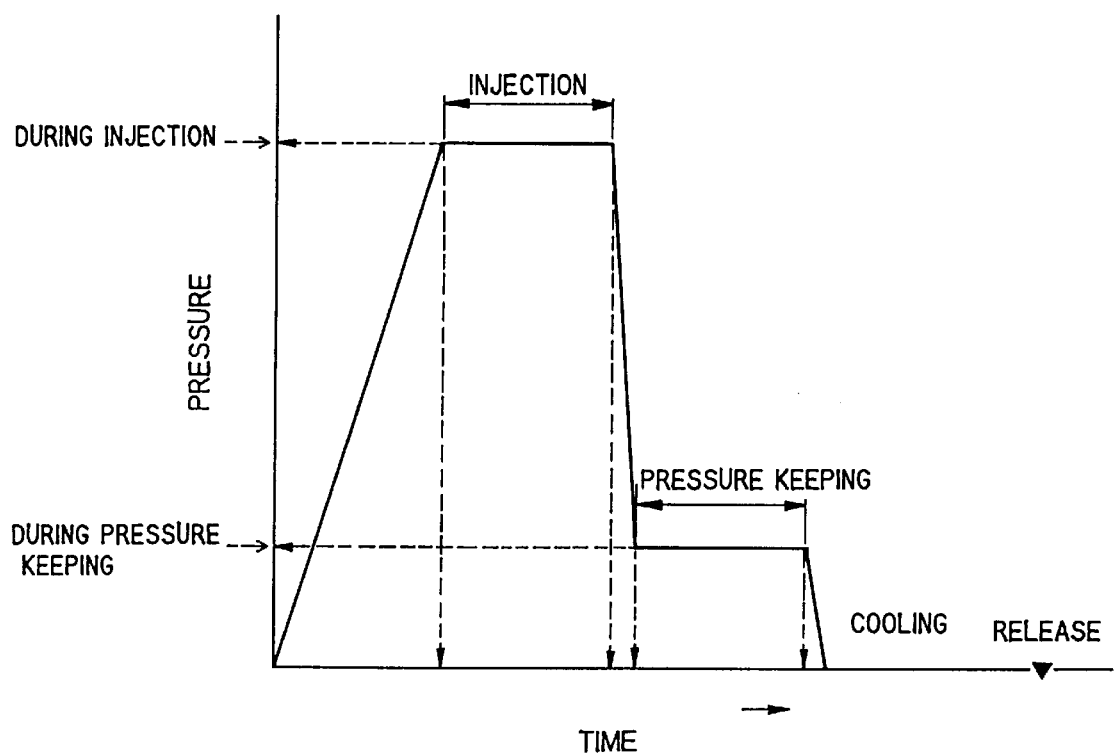
FIG. 2 is a graph showing the conditions of ordinary injection molding.

In order to control the weight I of the molded material within the specified range, there can be used ordinary injection molding conditions in mixture temperature (temperature of material to be injected), mold temperature (temperature of cavity surface), molding pressure, injection time, time of pressure keeping, etc. (See FIG. 2.)

Thus, in the present process, as compared with the conventional process in which the molding conditions can be determined only after the degreasing step (this step takes a long time), the time required for determining the molding conditions can be reduced significantly and the molding efficiency can be improved.

Further in the present process, the shape of the molded product can be controlled by controlling the weight I of the molded material. Therefore, the present process can be favorably applied for production of, in particular, a large size or thick molded product in which the density distribution of the mixture to be molded tends to be large.

The molded material obtained by the present injection molding using the weight I controlled as above, is then subjected to an ordinary degreasing step, an ordinary firing step and, as necessary, an ordinary grinding step, whereby a ceramic product can be produced.

The present invention is hereinafter described by way of Examples, but is not restricted thereto.

EXAMPLE 1

A silicon nitride powder and a sintering aid (true specific gravity=3.56) and a binder (true specific gravity=0.94) were mixed at a volume ratio of 48:52 to prepare a mixture to be molded.

The theoretical density Di of the mixture to be molded is 2.20 g/cc. The cavity volume Vc of the injection molding machine used was 400 cc. Therefore, the theoretical weight Iw of the molded material is 2.20×400=880 g.

The mixture to be molded was injected under the conditions shown in Table 1, i.e. various molding conditions which were combinations of mixture temperature, mold temperature, injection pressure, filled amount I, etc. The intended molded materials were each a radial turbine of $\phi$120 mm.

Each molded material obtained was subjected to fin removal and then measured for weight using an electron balance.

In the above weight measurement, in order to control and measure the filled amount I exactly, a base line was provided in the cavity and the portion of the mixture to be molded, exceeding the base line was removed as a fin.

After the above weight measurement, each molded material was placed in a furnace for applied-pressure degreasing and subjected to degreasing for 10 days. Each degreased molded material was subjected to CIP and then fired at 1,700° C. for 3 hours in a nitrogen atmosphere to obtain each ceramic product.

Figure 1:
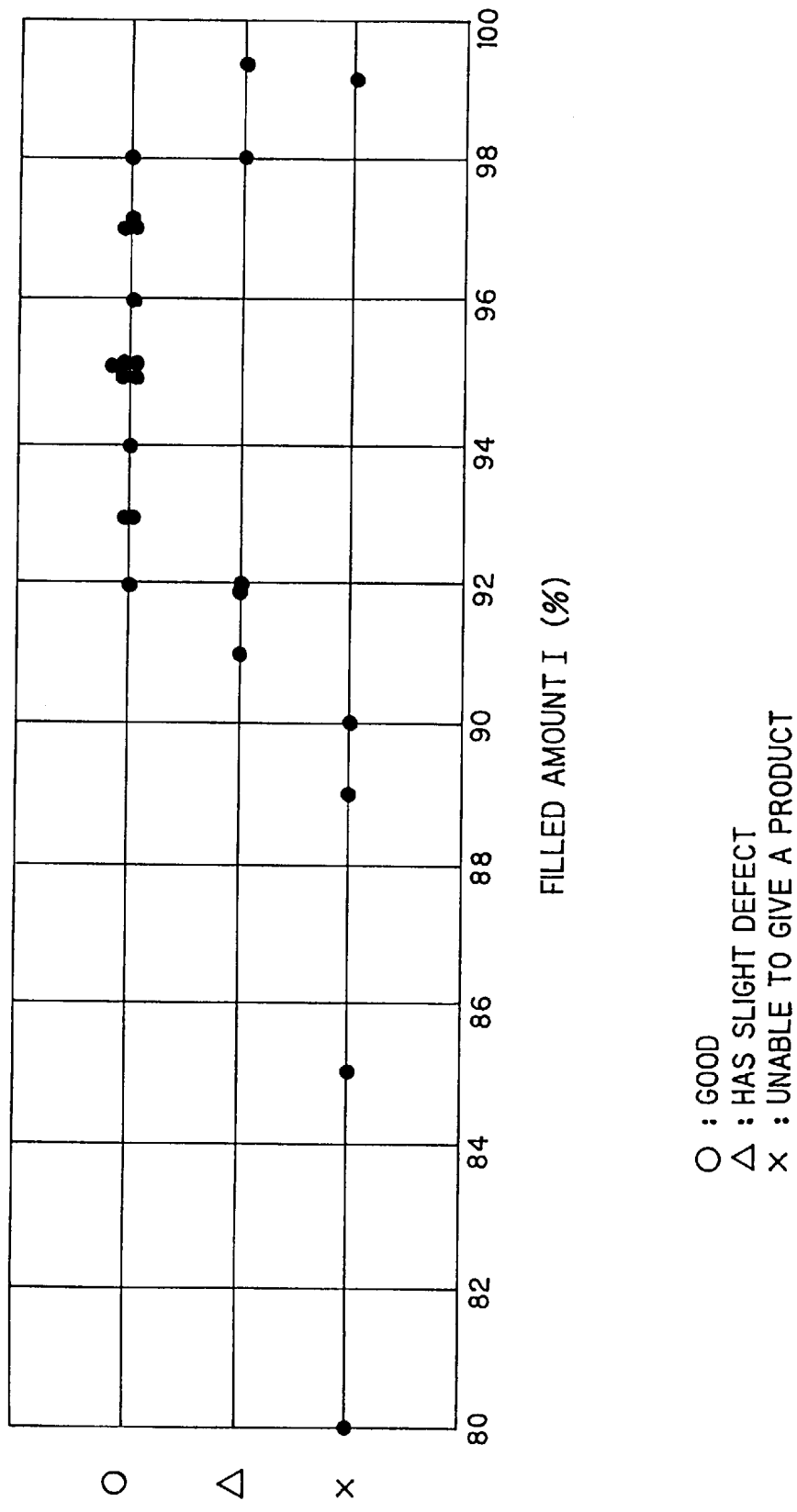
FIG. 1 is a graph showing the relation between the filled amount and the conditions of degreased material, obtained in Example 1.

The condition of each molded material, the condition of each degreased material and the dimensional accuracy of each product were observed and the results are summarized in Table 1. The relations between each filled amount I and the condition of each degreased material are shown in FIG. 1.

TABLE 1

| Sample No. | Mixture temp. (° C.) | Mold Temp. (° C.) | Injection pressure (kg/cm$^2$) | Injection time(min) | Pressure during pressure keeping (kg/cm$^2$) | Time of pressure keeping (min) | Filled amount I (%) | Condition of molded material | Condition of degreased material | Dimensional accuracy of product |
|---|---|---|---|---|---|---|---|---|---|---|
| 1 | 75 | 48 | 200 | 10 | 60 | 100 | 92 | Good | Δ | Δ |
| 2 | 70 | 48 | 200 | 10 | 60 | 100 | 95 | Good | ○ | ○ |
| 3 | 65 | 48 | 200 | 10 | 60 | 100 | 97 | Good | ○ | ○ |
| 4 | 60 | 48 | 200 | 10 | 60 | 100 | 80 | Not filled | x | x |
| 5 | 70 | 50 | 200 | 10 | 60 | 100 | — | Release was impossible | — | — |
| 6 | 70 | 48 | 200 | 10 | 60 | 100 | 95 | Good | ○ | ○ |
| 7 | 70 | 46 | 200 | 10 | 60 | 100 | 92 | Good | Δ | Δ |
| 8 | 70 | 44 | 200 | 10 | 60 | 100 | 85 | Not filled | x | x |
| 9 | 70 | 48 | 1000 | 10 | 60 | 100 | 99 | Good | x | x |
| 10 | 70 | 48 | 600 | 10 | 60 | 100 | 97 | Good | ○ | ○ |
| 11 | 70 | 48 | 200 | 10 | 60 | 100 | 95 | Good | ○ | ○ |
| 12 | 70 | 48 | 60 | 10 | 60 | 100 | 90 | Good | x | x |
| 13 | 70 | 48 | 200 | 60 | 60 | 100 | 98 | Good | Δ | Δ |
| 14 | 70 | 48 | 200 | 30 | 60 | 100 | 95 | Good | ○ | ○ |
| 15 | 70 | 48 | 200 | 10 | 60 | 100 | 93 | Good | ○ | ○ |
| 16 | 70 | 48 | 200 | 5 | 60 | 100 | 91 | Insufficiently filled | Δ | Δ |
| 17 | 70 | 48 | 200 | 10 | 200 | 100 | 98 | Good | Δ | Δ |
| 18 | 70 | 48 | 200 | 10 | 100 | 100 | 96 | Good | ○ | ○ |
| 19 | 70 | 48 | 200 | 10 | 60 | 100 | 94 | Good | ○ | ○ |

TABLE 1-continued

| Sample No. | Mixture temp. (° C.) | Mold Temp. (° C.) | Injection pressure (kg/cm$^2$) | Injection time(min) | Pressure during pressure keeping (kg/cm$^2$) | Time of pressure keeping (min) | Filled amount I (%) | Condition of molded material | Condition of degreased material | Dimensional accuracy of product |
|---|---|---|---|---|---|---|---|---|---|---|
| 20 | 70 | 48 | 200 | 10 | 20 | 100 | 92 | Good | Δ | Δ |
| 21 | 70 | 48 | 200 | 10 | 60 | 300 | 99 | Good | x | x |
| 22 | 70 | 48 | 200 | 10 | 60 | 200 | 97 | Good | o | o |
| 23 | 70 | 48 | 200 | 10 | 60 | 100 | 95 | Good | o | o |
| 24 | 70 | 48 | 200 | 10 | 60 | 50 | 93 | Good | o | o |
| 25 | 70 | 48 | 200 | 10 | 60 | 10 | 89 | Good | x | x | o. . .Good.
Δ. . .Has slight defect.
x. . .Unable to give a product.

As described above, in the present process, the weight of molded material is appropriately controlled based on the theoretical density of the mixture to be molded and the volume of the mold cavity used; as a result, favorable molding conditions can be determined prior to the degreasing step, and molding, degreasing and sintering can be conducted satisfactorily and stably; thereby, there can be obtained a ceramic product free from molding defect or degreasing defect and having excellent dimensional accuracy, at high productivity.

What is claimed is:

1. A process for producing a ceramic product comprising:

mixing and kneading a ceramic powder and a binder to obtain a mixture to be molded, injecting the mixture into the cavity of a mold to obtain a molded material, releasing the molded material and subjecting the released molded material to degreasing and firing, wherein the weight I of the material injected into the cavity of the mold is controlled so as to satisfy the following formula:

$$0.92 x Di x Vc \leq I \leq 0.98 x Di x Vc$$

where Di is the theoretical density (g/cc) of the mixture to be molded and Vc is the volume (cc) of the cavity.

2. A process according to claim 1, wherein the weight I of the molded material is the range of 93–97% of the theoretical weight of the molded material.

* * * * *